US005932293A

United States Patent [19]

Belashchenko et al.

[11] Patent Number: 5,932,293

[45] Date of Patent: *Aug. 3, 1999

[54] THERMAL SPRAY SYSTEMS

[75] Inventors: Vladimir E. Belashchenko; Viacheslav E. Baranovski, both of Richmond, Va.

[73] Assignee: Metalspray U.S.A., Inc., Richmond, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,262

[22] Filed: Mar. 29, 1996

[51] Int. Cl.[6] ................................ B05D 1/08; B23K 9/00

[52] U.S. Cl. .......................... 427/446; 427/449; 118/308; 118/313; 219/76.14; 219/76.16; 239/80; 239/81

[58] Field of Search .................................... 427/446, 449, 427/450, 453, 455; 118/305, 308, 313; 219/76.14, 76.16; 239/80, 81

[56] References Cited

U.S. PATENT DOCUMENTS

| | | |
|---|---|---|
| 3,635,644 | 1/1972 | Reid, Jr. . |
| 3,885,907 | 5/1975 | Teague, Jr. . |
| 4,342,551 | 8/1982 | Browning . |
| 4,343,605 | 8/1982 | Browning . |

(List continued on next page.)

FOREIGN PATENT DOCUMENTS

| | | |
|---|---|---|
| 0 410 569 A1 | 1/1991 | European Pat. Off. . |
| 863005 | 9/1981 | U.S.S.R. . |
| 952359 | 8/1982 | U.S.S.R. . |
| 1291216 | 2/1987 | U.S.S.R. . |
| 1329836 | 8/1987 | U.S.S.R. . |
| 1441254 | 11/1988 | U.S.S.R. . |
| 1446536 | 12/1988 | U.S.S.R. . |
| 1490598 | 6/1989 | U.S.S.R. . |
| 1565536 | 5/1990 | U.S.S.R. . |
| 1659126 A1 | 6/1991 | U.S.S.R. . |
| 1699638 A1 | 12/1991 | U.S.S.R. . |
| 1706716 A1 | 1/1992 | U.S.S.R. . |

OTHER PUBLICATIONS

"Aluminium Cushions with Sprayed Steel Coating for Repair of Wagon Spring Beams" by Popov S.I., Korobov U.S. and Baranovski V.E., Welding Produciton, 1, 1997, pp. 24–26 (no month).

"Methodological Recommendations for Activated Electrical Arc Spraying Process Parameters Choice" by Dorozkin N.N., Baranovski, V.E., Minsk Indmash An BSSR, 1985.

"The Activation of Electric Arc Spraying Process" by Dorozkin N.N., Baranovski V.E. and Elistratov A.P., Izvestia An BSSR, 3 (1983), pp. 73–78 (no month).

Chaffin et al., "Experimental Investigation of Premixed Combustion within Highly Porous Media," *ASME/JSME Thermal Engineering Proceedings,* 4:219–224, ASME—1991.

*Primary Examiner*—Shrive Beck
*Assistant Examiner*—Bret Chen

[57] ABSTRACT

A thermal spray system includes a combustion unit connected to at least one port for supplying a flow of a combustible fluid from an external source of fuel and oxidant. The combustion unit includes a permeable burner block constructed to receive said combustible fluid from and to generate a high-energy stream of gas. The thermal spray system also includes an exhaust nozzle constructed to direct the high-energy stream of gas toward a substrate, and a material delivery unit constructed to deliver a material into the high-energy stream of gas to form a highly energized stream of particles. When the thermal spray system is used for bead blasting, the provided material is an abrasive material. Alternatively, when the thermal spray system is used for coating a substrate, the provided material is a coating material. The material delivery unit may be an injector or an electric arc unit. Instead of the combustion unit burning the combustible fluid, the thermal spray system may include a source of a high-pressure preheated gas such as a plasma source or an electric heat exchange source.

55 Claims, 10 Drawing Sheets

U.S. PATENT DOCUMENTS 4,370,538 1/1983 Browning .
4,416,421 11/1983 Browning .
4,464,414 8/1984 Milewski et al. .
4,540,121 9/1985 Browning .
4,568,019 2/1986 Browning .
4,634,611 1/1987 Browning .
4,788,077 11/1988 Kang ....................................... 427/452
4,836,447 6/1989 Browning .
4,869,936 9/1989 Moskowitz et al. .
4,900,245 2/1990 Ahmady .
4,906,178 3/1990 Goldstein et al. .
4,911,363 3/1990 Webber .
4,945,890 8/1990 Ripka .
4,960,458 10/1990 Browning .
5,019,429 5/1991 Moskowitz et al. .
5,019,686 5/1991 Marantz et al. ..................... 219/76.14
5,046,944 9/1991 Smith .
5,047,265 9/1991 Simm et al. .
5,077,089 12/1991 Otto .
5,082,179 1/1992 Simm et al. .
5,095,189 3/1992 Frind et al. .
5,109,150 4/1992 Rogers .
5,120,582 6/1992 Browning .
5,148,986 9/1992 Rusch .
5,151,308 9/1992 Moskowitz et al. .
5,154,354 10/1992 Reiter .
5,165,705 11/1992 Huhne .
5,191,186 3/1993 Crapo, III et al. ..................... 427/449
5,206,059 4/1993 Marantz .
5,217,700 6/1993 Kurihara et al. .
5,225,655 7/1993 Muehlberger .
5,225,656 7/1993 Frind .
5,249,954 10/1993 Allen et al. .
5,262,206 11/1993 Rangaswamy et al. ................ 427/452
5,271,965 12/1993 Browning .
5,285,967 2/1994 Weidman .
5,296,667 3/1994 Marantz et al. .
5,302,414 4/1994 Alkhimov et al. .
5,330,798 7/1994 Browning .
5,338,364 8/1994 Kurihara et al. .
5,357,075 10/1994 Muehlberger .
5,364,663 11/1994 McCune, Jr. et al. .................. 427/449
5,384,164 1/1995 Browning .
5,405,085 4/1995 White .
5,439,714 8/1995 Mori et al. .
5,456,951 10/1995 Mori et al. .
5,468,295 11/1995 Marantz et al. .
5,520,334 5/1996 White .
5,528,010 6/1996 Herwig et al. .

THERMAL SPRAY SYSTEMS

BACKGROUND OF THE INVENTION

The present invention relates to thermal spray systems for deposition of high quality coatings.

Different thermal spraying methods, such as, flame spraying (including high-velocity oxy-fuel (H.V.O.F.) thermal spray devices, and high-velocity air-fuel (H.V.A.F.) thermal spray devices), plasma spraying, and electric arc spraying, have been used to coat metallic or other surfaces. A flame spray device deposits typically metals, ceramics, or cermet types of materials onto a substrate. The flame spray device includes a combustion chamber that receives a mixture of fuel (e.g., propylene or propane) and oxidant (e.g., oxygen or air) in the form of a pressurized gas and generates in a combustion reaction a high-temperature, high-pressure combustion stream. The device directs the combustion stream from the combustion chamber into a flow nozzle. The spray material (e.g., a powder, a solid rod or wire) is introduced into the high-velocity combustion stream, which at least partially melts the material. The combustion stream also "atomizes" the melted of softened material and propels it to the target substrate. Depending on the design, different devices can accelerate the particle stream up to supersonic velocities or hypersonic velocities (i.e., velocities equal to several times the velocity of sound). The supersonic particle stream may be generated by a single stage combustion device or two stage combustion device or by a device that produces steady-state continuous detonations.

A plasma spray device generates and emits a high-velocity, high-temperature gas plasma delivering a powdered or particulate material onto a substrate. The device forms the gas plasma by flowing a gas through an electric arc in the nozzle of a spray gun, causing the gas to ionize into a plasma stream. The spray material, which may be preheated, is introduced in the plasma stream. The particle-plasma stream, which can be accelerated up to a hypersonic velocity, is directed to the substrate. While plasma spraying can produce good quality coatings, the device is relatively complex and expensive.

An arc spray device generates an electric arc zone between two consumable wire electrodes, which may be solid or composite wires. As the electrodes melt, the device continuously feeds the electrode wires into the arc zone and also blasts a compressed gas into the zone to break and "atomize" the molten material. The compressed gas propels the atomized material and directs it to the substrate to form a coating. Alternatively, an arc spray device can use non-consumable electrodes and introduce powder into the heated gas.

SUMMARY OF THE INVENTION

In general, the invention features several novel systems for spray depositing coatings of ceramics, carbides, metallic or cermet type of materials, composite materials, alloys, stainless steel, and other materials. The deposition systems are constructed to control and optimize the size, temperature, velocity and composition of the particles sprayed during the deposition process. The systems deposit high quality, high tech coatings of a selected composition and properties such as a high bond strength, low porosity, high heat resistance, high temperature oxidation resistance, high thermal shock resistance, high corrosion resistance, high permeation resistance, or tailored electrical and magnetic properties. These coatings are used in different industries, such as, aerospace, petrochemical, electric utility, or pulp and paper.

In general, in one aspect, a highly efficient thermal spray system, in the form of a robot, "smart system," hand held gun, or the like, is constructed to deposit a coating on a substrate. The thermal spray system includes a combustion unit receiving a pressurized flow of combustible media, formed by a fuel and an oxidant supplied from at least one external source. The combustion unit includes a burner having a plurality of orifices constructed to convey the combustible media to a combustion region. Alternatively, the combustion unit includes a permeable burner block made of a material with a low thermal conductivity such as a porous ceramic block. The combustion process generates a high energy stream of gas. The thermal spray system also includes a material delivery unit constructed to deliver selected materials into the high energy stream of gas to create a highly energized particle stream, which is then directed to the substrate.

Depending on the sprayed material, the thermal spray system controls the temperature and velocity of the particle stream. When powder materials that change their chemistry in molten state (i.e., decompose or oxidize while propelled by the stream) are being sprayed, the system only partially melts or softens the particles prior to the deposition. The system controls the temperature of the primary combustion stream primarily by selecting a suitable fuel and oxidant that burn at the desired temperature. Furthermore, the system controls the dwell time of the particles in the energized stream by having a proper length of an exhaust nozzle and by employing a secondary gas stream. For this purpose, the system includes several exchangeable, exhaust nozzles of different geometries. The velocities of the primary and secondary streams are controlled by the pressure of the supplied gases and the relative geometry of the combustion unit and the nozzles. At higher velocities lower temperatures and dwell times may be used. The material delivery unit may inject solid or powder material into the high energy combustion stream. A mechanical powder feeder or a pneumatic powder feeder may dispense controlled amounts of the powder into a carrier gas of a selected pressure and temperature to control the spray rate. The size of the particles depends on the feed stock. The temperature and velocity of the deposited particles are adjusted so that upon hitting the substrate each softened particle spreads continuously to cover an area without significantly splashing or sputtering.

The novel combustion unit is optimized for an efficient combustion process. A mixing assembly provides a premixed combustible medium to the burner, which preheats the medium as it is advanced to a combustion region of the burner. The burner, including the orifices or the porous openings, is designed to burn a selected amount of combustible media at selected temperatures and produce a selected amount of the combustion products. The orifices or the porous openings are designed to confine the combustion region at a desired pressure range of the combustible media. The burner efficiently burns the combustible medium and produces combustion products that are relatively insensitive to fuel grade and fuel impurities. The combustion process produces a relatively small combustion roar.

In general, in another aspect, a thermal spray system for coating a substrate with a material includes a combustion unit connected to at least one port constructed to supply a flow of a combustible fluid from an external source of fuel and oxidant. The combustion unit includes a permeable burner block constructed to receive the combustible fluid and generate a high-energy stream of gas. The thermal spray system also includes an exhaust nozzle constructed to receive the stream of gas and direct the stream of gas toward a substrate, and a material delivery unit constructed to deliver a selected material into the high-energy stream of gas to form a highly energized stream of particles.

Embodiments of this aspect may include one or more of the following features. The permeable burner block includes a plurality of orifices constructed to transport the combustible fluid to a combustion region of the combustion unit. The permeable burner block is made of a ceramic material.

The material delivery unit includes an injector constructed to inject a controlled quantity of the selected material to the high-energy stream.

The injector, connected to the nozzle, is constructed to inject controlled quantity of particles to the high-energy stream passing through the nozzle.

The injector, connected to the nozzle at a selected angle, is constructed to inject controlled quantity of particles to the high-energy stream passing through the nozzle and control a dwell time of the particles.

The material delivery unit includes several injectors, each the injector is constructed to inject a controlled quantity of the selected material to the high-energy stream.

The material delivery unit further includes a source of a carrier gas connected to the injector, and a dispenser constructed to introduce a controlled quantity of particles of the selected material to the carrier gas to create a particle-gas medium. The injector is further constructed to inject the particle-gas medium into the high-energy stream of gas. The source may be a plasma arc torch constructed to preheat the carrier gas to a selected temperature.

The injector is located in a bore of the combustion unit and is constructed to introduce axially the particle-gas medium into the high-energy stream of gas.

The material delivery unit further includes a heater constructed to preheat the carrier gas to a selected temperature.

The material delivery unit further includes a pressure valve constructed and arranged to control pressure of the carrier gas.

The thermal spray system may further include a heat exchange conduit at least partially surrounding the combustion unit or the nozzle. The conduit is constructed to convey the carrier gas prior to injecting the gas-particle medium into the high-energy stream.

The material delivery unit includes a feeding mechanism constructed to gradually introduce the selected material, shaped to form an elongated member, into the high-energy stream of gas. The elongated member, for example, a tape, a cord, a wire, or a rod, may include a core made of a selected powder.

The thermal spray system may include a feeding mechanism constructed to introduce the elongated member axially through a bore in the combustion unit.

The thermal spray system may further include a pressure controller constructed to control pressure of the combustible fluid. The thermal spray system may include a fuel port and an oxidant port both connected to a mixing region. The fuel port and the oxidant port are connected to external sources of fuel and oxidant, respectively. The fuel port is connected to a fuel pressure controller constructed to control pressure of the fuel, and the oxidant port is connected to an oxidant pressure controller constructed to control pressure of the oxidant.

The thermal spray system may further include a high-pressure gas unit. The high-pressure gas unit includes an external gas source constructed to provide a high-pressure gas; a heat exchange conduit, at least partially surrounding the combustion unit or the nozzle, constructed to receive the high-pressure gas from the external gas source and to convey the high-pressure gas to provide cooling of external surfaces of the combustion unit or the nozzle. The high-pressure gas unit includes an annular opening, located at a distal end of the nozzle, constructed and arranged to emit axially an annular stream of gas surrounding the highly energized stream of particles. The gas source may provide a gas pressure selected relative to a size of the annular opening so that the annular stream of gas has about the same velocity as the highly energized stream of particles. The gas source may provide an inert gas or nitrogen.

The thermal spray system may further include a second combustion unit having an annular geometry around the exhaust nozzle. The second combustion unit is constructed to generate a second high-energy stream of annular cross section. This system also includes a second exhaust nozzle constructed and arranged to receive the second high-energy, annular stream and axially emit the second high-energy, annular stream surrounding the highly energized stream of particles. The second combustion unit may include a second permeable burner. The second combustion unit may include a combustion chamber. The second nozzle may be made of a ceramic material.

The thermal spray system may include a combustion unit that has an axial bore and a plasma torch partially located in the bore. The plasma torch is constructed to deliver axially the material in form of at least partially melted particles into the high-energy stream of gas.

The thermal spray system may include a combustion unit that has an axial bore and the material delivery unit, partially located in the bore, includes an electric arc unit with consumable electrodes extending through the bore.

The thermal spray system may include a material delivery unit with two consumable electrodes extending through a bore in the combustion unit, and a motor assembly constructed to move the two electrodes continuously along intersecting paths. This material delivery unit also includes an electric arc source constructed to maintain an electric arc between the tips of the electrodes. The tips may be located outside of the nozzle or inside of the nozzle. The electric arc is axially aligned with the nozzle and arranged to melt at least partially the tips. The exhaust nozzle is further constructed to direct the stream of gas toward the electric arc thereby creating the highly energized stream of particles directed to the substrate.

The thermal spray system may include an external electric arc unit. The external arc unit includes two consumable electrodes of a selected material, and an electric power supply constructed to maintain an electric arc between tips of the electrodes. The electric arc is arranged to melt at least partially the tips. The external arc unit also includes a motor assembly constructed to feed said two consumable electrodes a rate of removal of the material from the tips by the highly energized stream of gas and particles.

In general, in another aspect, a thermal spray system for delivering abrasive material to a substrate includes a combustion unit connected to at least one port constructed to supply a flow of a combustible fluid from an external source of fuel and oxidant. The combustion unit includes a permeable burner block constructed to receive the combustible fluid and generate a high-energy stream of gas. The thermal spray system also includes an exhaust nozzle constructed to receive the stream of gas and direct the stream of gas toward a substrate, and a material delivery unit constructed to deliver particles of an abrasive material into the high-energy stream of gas to form a highly energized stream of abrasive particles.

Embodiments of this aspect may include one or more of the following features. The material delivery unit may include an injector constructed to inject a controlled quantity of the abrasive material to the high-energy stream.

The material delivery unit may further include a source of a carrier gas connected to the injector, and a dispenser constructed to introduce a controlled quantity of particles of the abrasive material to the carrier gas to create a particle-gas medium. The injector is further constructed to inject the particle-gas medium into the high-energy stream of gas. The injector is located in a bore of the combustion unit and is constructed to introduce axially the particle-gas medium into the high-energy stream of gas.

The injector or the exhaust nozzle may be made of a ceramic material. The ceramic material may be silicon carbide, boron carbide, tungsten carbide, silicon nitride, aluminum oxide or chromium oxide.

In general, in another aspect, a highly efficient electric arc spray system in the form of a robot, "smart system," hand held gun, or the like, is constructed to deposit a coating on a substrate. The electric arc spray system includes a feeding assembly for feeding along intersecting paths two consumable electrodes made of selected materials, and an electric arc unit for maintaining an electric arc between the tips of the electrodes. The feeding assembly advances the consumable electrodes while maintaining the electrode tips at a selected relative geometry, which provides a relatively close spacing of the tips. The electric arc unit provides a voltage and current control. The electric arc unit delivers a selected current to the electrode tips and adjusts the voltage across the tips at a relatively small level, which still provides a stable arc. The electric arc at least partially melts the materials of the electrodes. The nozzle directs a high-energy gas stream through the arc to atomize the materials and propel the particles in a high-energy stream of gas having a selected velocity.

The electric arc spray system also controls the velocity of gas stream through the arc to generate a dense and relatively focussed high-energy stream of melted particles. As the feeding assembly advances the electrodes, the spray materials are melted and atomized at a selected rate in the gas stream. A gas stream of higher velocities generates smaller particle size up to a limiting critical value; and the smaller particle size yields denser coatings. However, the atomizing gas stream has also a direction and velocity that minimizes dispersion forces acting on the stream (e.g., the Lorentz force of the electric arc, and shock waves formed at supersonic velocities). Furthermore, the temperature of the gas is kept relatively high to increase the sound velocity, which in turn permits higher velocities of the gas stream. The spray system may also employ a second annular stream of a high velocity that surrounds and focuses the high-energy particle stream. The system achieves a narrower stream of the highly energized particles and the narrower the stream, the denser the coating. An annular stream of inert gas or nitrogen may be used to limit oxidation of the melted particles. The melted particles are deposited on the substrate at velocities where splashing or sputtering of the molten material does not occur or is negligible.

In general, in another aspect, an electric arc system for coating a substrate with a material includes a motor assembly constructed to feed two consumable electrodes of the material, and an electric arc unit including an electric power supply constructed to maintain an electric arc between tips of the electrodes. The electric arc is arranged to melt at least partially the tips. The electric arc system also includes a thermal source connected to a supply of high-pressure gas and constructed to generate a high-temperature gas of a pressure between 25 psi and 100 psi, and an exhaust nozzle constructed to receive the high-temperature gas from the thermal source and emit a high-temperature, high-velocity gas stream toward the melted tips thereby forming a highly energized stream of at least partially melted particles directed to the substrate.

Embodiments of this aspect may include one or more of the following features. The electric arc spraying system may further include a feedback unit, connected to the electric power supply, constructed to stabilize the electric arc at a selected current and voltage. The feedback unit may be a voltage feedback unit.

The thermal source may include a plasma source, an electrical heat exchange unit, or a combustion unit constructed to generate the high-temperature gas. The combustion unit may include a permeable burner.

The electric arc spraying system may further comprise a high-pressure gas unit including a second supply of gas constructed to provide high-pressure gas, and a heat exchange conduit, at least partially surrounding the nozzle, constructed to receive the high-pressure gas from the second supply and to convey the high-pressure gas to provide cooling of external surfaces of the combustion unit or the nozzle. The high-pressure gas unit also includes an annular opening, located at a distant end of the nozzle, constructed and arranged to emit axially an annular stream of gas surrounding the highly energized stream of at least partially melted particles. The annular stream may be emitted at a velocity of the highly energized stream of at least partially melted particles. The annular stream may be emitted at a temperature of the highly energized stream of at least partially melted particles.

The exhaust nozzle may have a diameter between 7.5 millimeters and 25 millimeters or a diameter between 10 millimeters and 15 millimeters.

These and several other features will be also described in connection with the preferred embodiments and with reference to the following drawings.

DESCRIPTION OF THE PREFERRED EMBODIMENTS

Figures 1, 1A, 1B, 1C, 1D:
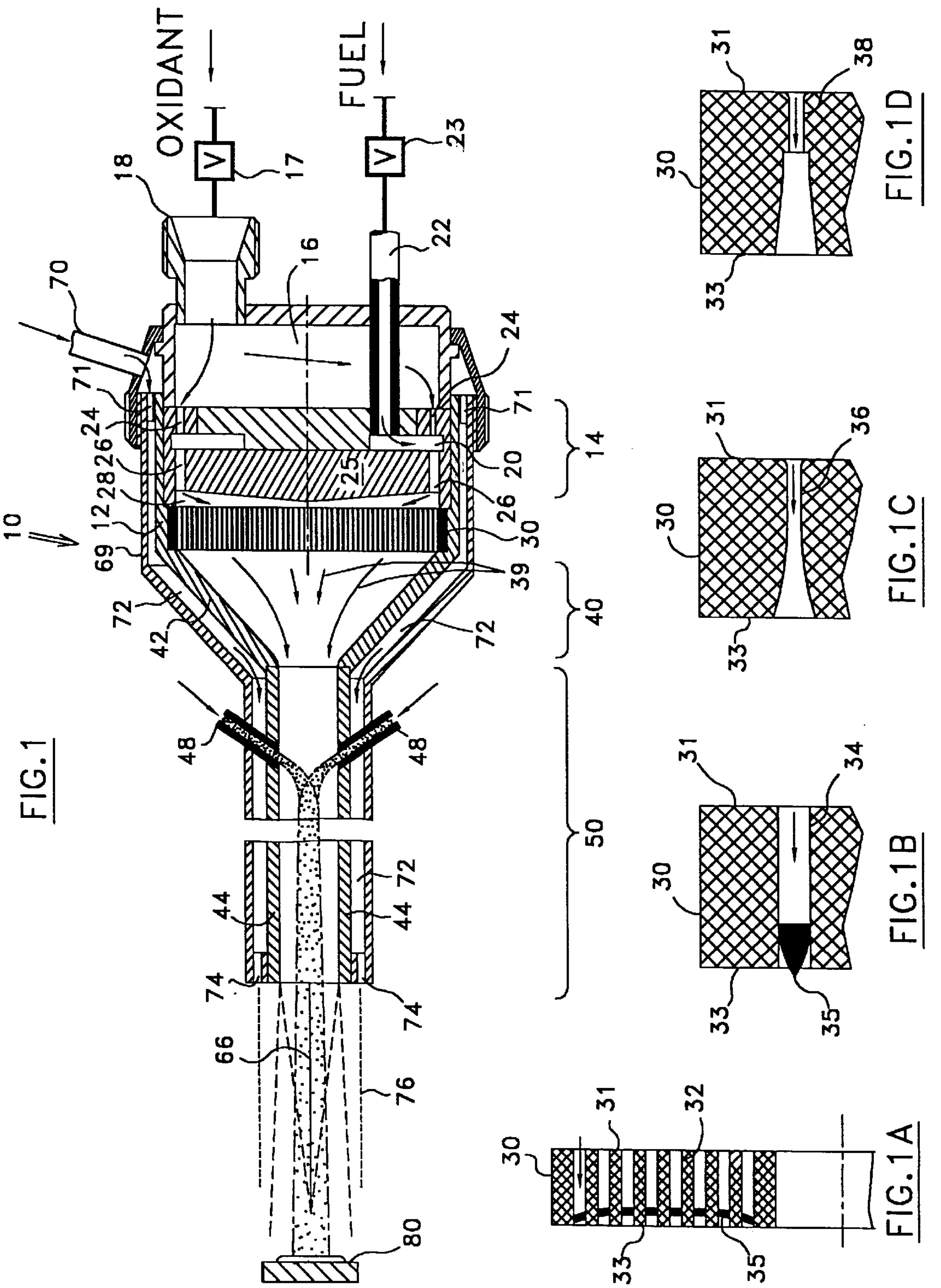
FIG. 1 is a cross-sectional view of a thermal spray device with a permeable burner and powder injectors for feeding spraying materials.
FIG. 1A is a cross-sectional view of a segment of the permeable burner of FIG. 1.
FIGS. 1B, 1C and 1D are cross-sectional views of different designs of orifices of a burner block.
Figure 1E:
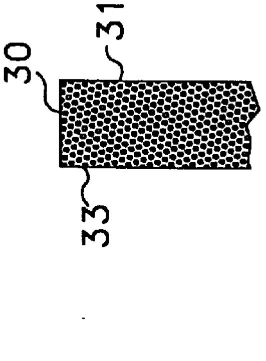
FIG. 1E is a cross-sectional view of a porous ceramic burner block.

Referring to FIG. 1., a thermal spraying device 10 includes a combustion unit located inside a body 12, a material delivery unit, and an exhaust nozzle 50. The combustion unit includes a mixing assembly 14 and a permeable burner 30. Mixing assembly 14 includes an oxidant distribution chamber 16, a mixing chamber 20, a mixing block 25 and a mixture distribution chamber 28. An oxidant supply line 18 delivers oxidant to oxidant distribution chamber 16, which is connected to mixing chamber 20 through cylindrical bores 24. A fuel supply line 22 delivers fuel directly to mixing chamber 20. A set of cylindrical bores 26 located in mixing block 25 connects mixing chamber 20 to mixture distribution chamber 28. Also referring to FIGS. 1A through 1D, permeable burner 30 is a block of material of low thermal conductivity with a plurality of orifices 32. Orifices 32 may have a cylindrical shape 34, or venturi-like shapes 36 or 38 with a diameter on the order of a millimeter (or less than a millimeter) depending on the type of the combustible fluid, the desired flow rates, the size of the burner block or other design parameters. Alternatively, permeable burner 30 is a block of a porous ceramic material shown in FIG. 1E.

Thermal spray device 10 is constructed for optimal performance and control of the combustion process. A compressed oxidant of a selected pressure (50 psi to 200 psi) is supplied from oxidant supply line 18 to oxidant distribution chamber 16. The oxidant then passes to mixing chamber 20 via cylindrical bores 24 and is mixed with fuel delivered to mixing chamber 20 via fuel supply line 22. Fuel supply line 22 is constructed to deliver a gaseous fuel (e.g., propane, propylene, methane, natural gas, or Mapp gas) of a selected pressure in the range of 35 psi to 200 psi. If the system uses a liquid fuel (e.g., kerosene, or diesel), the liquid is prevaporized by a vaporizer. The mixing ratio is regulated by the relative pressures of oxidant and fuel controlled by valves 17 and 23, respectively. The combustible mixture then passes through cylindrical bores 26 to mixture distribution chamber 28. Distribution chamber 28 is constructed to distribute uniformly the combustible mixture over upstream surface 31 of permeable burner 30. The distributed mixture passes through orifices 32 and is initially ignited by a conventional piezoelectric igniter or an electrical igniter (not shown).

Permeable burner 30 burns the combustible mixture and produces a combustion stream that propels the sprayed material to a target substrate 80. The size of the block and the size of the orifices are selected depending on the type of the combustible fluid, which defines the flame velocity (i.e., burning rate), and on the operational range of the combustible fluid. Generally, the flow rate through the burner block is several times larger that the flame velocity. The orifice design eliminates danger of a flashback of the flame due to both a very high pressure or a very low pressure of the combustible mixture. After ignition the mixture burns mainly inside orifices 32 with the flame at positions 35 located adjacent to downstream surface 33. The burner block warms up, conducts heat toward upstream surface 31 and preheats the combustible mixture flowing in the orifices prior to combustion. However, since the block material has a relatively low thermal conductivity, it does not raise the temperature of the mixture at upstream surface 31 to a point where an undesired ignition could occur in mixture distribution chamber 28.

Depending on the velocity of the mixture, which in turn depends on the pressures of the fuel and the oxidant, flame positions 35 move generally inside orifices 32 in the flow direction. At pressures, wherein the mixture flow rate is lower than a designed operational range of the burner, the temperature of surface 31 remains relatively low; this practically eliminates the likelihood of a flashback. At high pressures, downstream surface 33 warms up more than upstream surface 31, and also the orifices will be at a higher temperature, therefore, flame positions 35 will be relatively confined inside the orifices. (The system also includes a low pressure sensor and a high pressure sensor installed in the supply lines. The sensors can interrupt the entire process when the pressure depart from a selected range.) To increase the operational range and stabilize the flame position, a permeable burner with venturi-like shaped orifices 36 are used. In orifices 36, due to converging walls and the correspondingly reduced cross section, the velocity of the mixture gradually decreases from upstream surface 31 to downstream surface 33. Thus flame position 35 remains within the orifices at higher pressures of the mixture. The flame will be positioned at a location inside the orifices, where the rate of the combustible media and the rate of the flame advancement reach an equilibrium. Therefore, the shape of the orifices can be optimized for a desired range of operation and combustion mixtures.

The combustion products 39 produced by burner 30 enter a forming block 40 connected to exhaust nozzle 50. Since the walls of forming block 40 are converging, the velocity of the combustion products further increases. The material delivery unit is connected to nozzle 50 and includes at least one powder injector 48 constructed to inject powders of different sizes and chemistry into the combustion jet. Each injector 48 has a selected angle relative to the nozzle axis; this controls the dwell time of the powder inside nozzle 50, which in turn controls the powder temperature. Furthermore, the length nozzle 50 is designed to provide enough dwell time for the injected powder to be softened or melted as the high velocity combustion stream 66 propels the powder toward coating surface 80.

A cooling jacket 69 surrounds combustion body 12, a forming block body 42, and a nozzle body 44 and protects them against overheating. The cooling jacket includes a gas port 70, a cooling passage 72 and an exit opening 74. A compressed gas is introduced at gas port 70 and passes through a set of cylindrical bores 71 to cooling passage 72. While being preheated by the heat exchange process, the compressed gas then passes through cooling passage 72 to exit opening 74, where the preheated gas forms an annular stream 76. The velocity of annular stream 76 is controlled by a valve located at gas port 70 and also depends on the size of opening 74. Annular stream 76 surrounds the primary combustion-particle stream 66 and provides a shroud that decreases deceleration of the primary stream. If an inert gas (or nitrogen) is introduced at gas port 70, the shroud reduces oxidation of the deposited particles.

Figure 2:
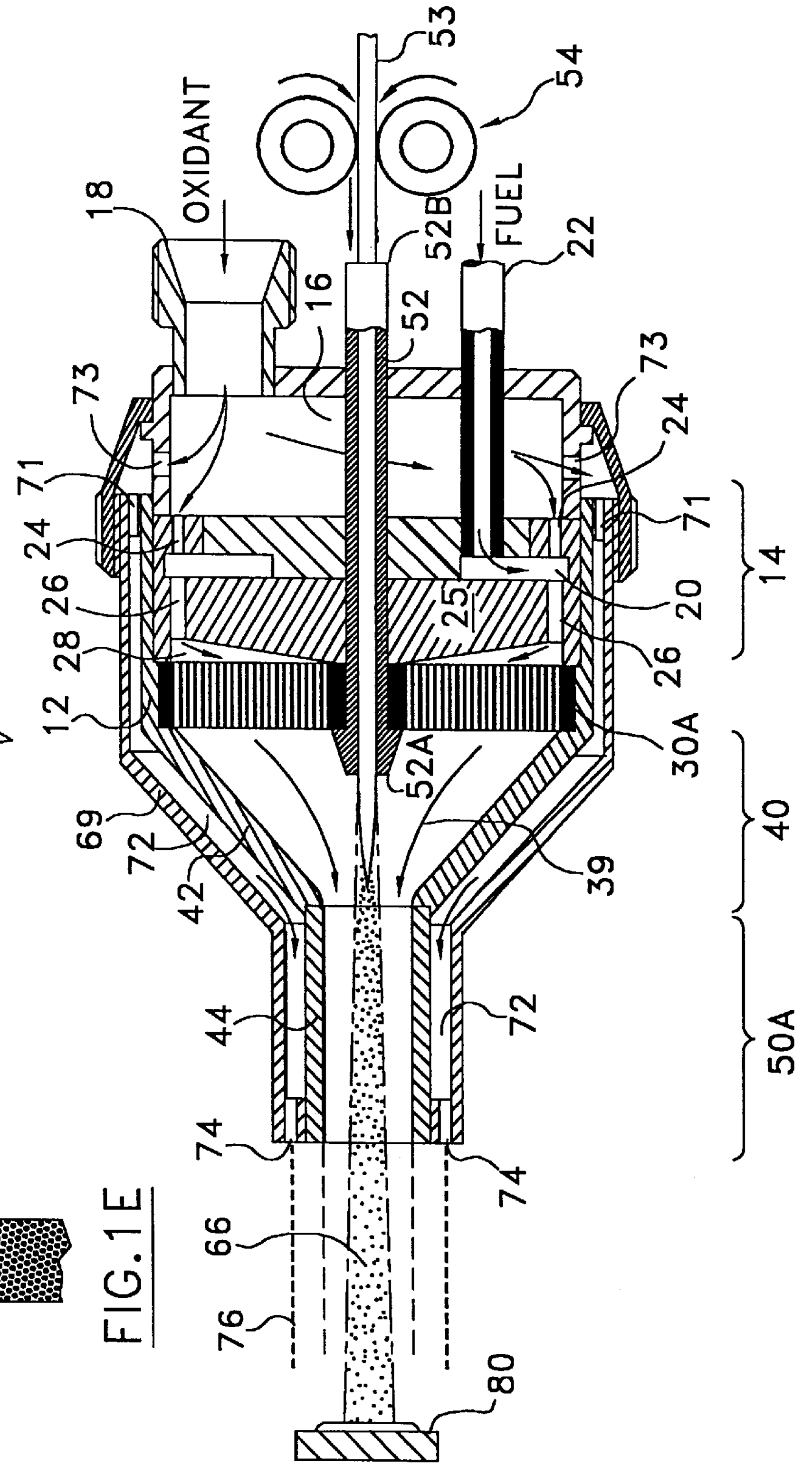
FIG. 2 is a cross-sectional view of a thermal spray device with a permeable burner and an axial system for feeding the spraying material.

Referring to FIG. 2, in another embodiment, a thermal spray device 10A includes a similar combustion unit and an exhaust nozzle as device 10, but has a different material delivery unit. The combustion unit includes mixing assembly 14 and an annular permeable burner 30A. The material delivery unit includes an axially located tube 52 for feeding an elongated member 53 (e.g., a wire, a rod, a tape or a cord manufactured by SNMI, Avignon, France) made of the spraying material. Tube 52 extends from its distal end 52A located inside forming block 40 through permeable burner 30A and mixing assembly 14 to its proximal end 52B located near two rollers 54. Distal end 52A is positioned in the stream of combustion products 39, which melt and atomize the wire, and accelerate the melted particles toward substrate 80. The deposition rate depends on the combustion parameters and the feeding speed controlled by rollers 54. Since the accelerated particles melt in forming region 40, only a relatively short dwell time is needed. The dwell time depends on the relative geometry of forming region 40 and nozzle 50. In this design, nozzle 50A must be relatively short to prevent particle build up on inner walls of nozzle body 44.

Thermal spray device 10A uses compressed air as an oxidant and a coolant. The compressed air is introduced via oxidant supply line 18 to oxidant distribution chamber 16 and further to fuel mixing chamber 20, as described in connection with device 10. Furthermore, the compressed air passes via holes 73 and 71 to cooling passage 72 and cools combustion body 12, forming block body 42 and nozzle body 44. The preheated compressed air then exits the cooling jacket via opening 74 and forms an annular stream 76.

Figure 3:
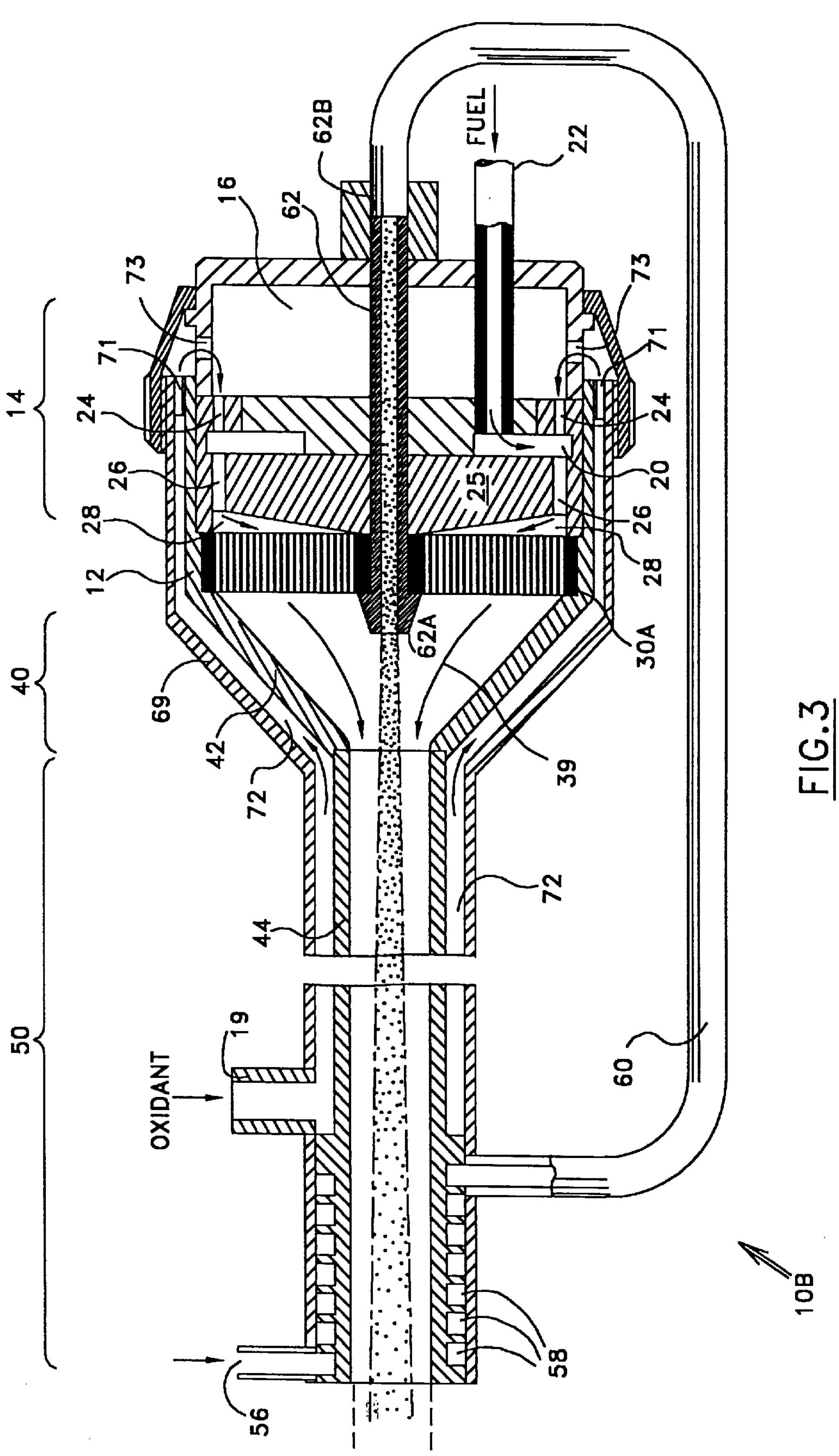
FIG. 3 is a cross-sectional view of a thermal spray device with a permeable burner block and an axial powder injector for feeding a preheated spraying material.

Referring to FIG. 3, in another embodiment, a thermal spray device 10B is constructed to preheat both the spray powder introduced axially to the combustion stream and the oxidant. Device 10B has a similar mixing assembly 14 as does device 10A, wherein the gaseous fuel is introduced via fuel supply line 22 to mixing chamber 20. However, a compressed oxidant is introduced via an oxidant supply port 19 to cooling passage 72. The oxidant is preheated as it cools nozzle body 44, forming block body 42 and combustion body 12. The preheated oxidant enters oxidant distribution chamber 16 through holes 71 and 73, and further enters mixing chamber 20 via cylindrical bores 24. In mixing chamber 20, the preheated oxidant mixes with the fuel and the combustible mixture enters mixture distribution chamber 28 via cylindrical bores 26.

The material delivery unit of device 10B includes a powder port 56 connected to a helical conduit 58 made of a heat conducting material and thermally coupled to nozzle body 44. Helical conduit 58 is connected to an injector 62 by a return tube 60. Injector 62 extends from its distal end 62A, located inside forming block 40, through permeable burner 30A and mixing assembly 14 to its proximal end 62B connected to return tube 60. The spray powder propelled by a carrier gas is introduced at powder port 56 and is preheated while passing through helical conduit 58. The preheated powder passes through injector 62 and is introduced into combustion products 39. The dwell time of the powder is controlled by the velocities of the carrier gas and combustion products 39. Device 10B can spray powders with a relatively high melting temperatures. The temperature of the sprayed powder is controlled by controlling the preheating temperature and the dwell time.

Figure 4:
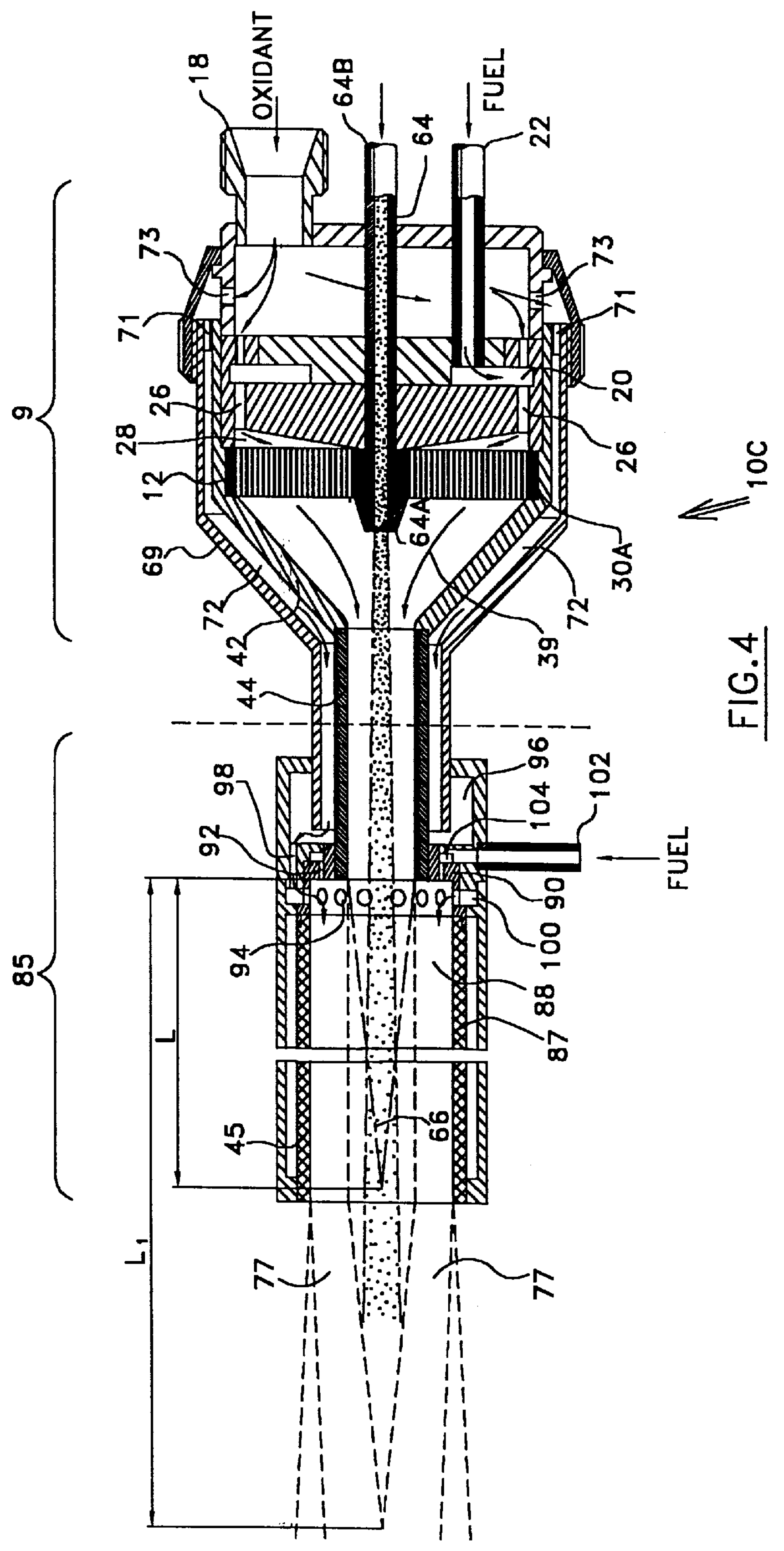
FIGS. 4 and 5 are cross-sectional views of different embodiments of a thermal spray device with a permeable burner and a secondary burner.

Referring to FIG. 4, in another embodiment, a thermal spray device 10C includes a primary thermal stage 9 and a secondary thermal acceleration stage 85. The primary stage is similar to thermal spray device 10B; however, it does not have a material delivery unit with the helical preheating device nor oxidant preheating. Secondary thermal acceleration stage 85 includes a combustion chamber 88, a ceramic nozzle 87, a gas distributor 90 with a set of bores 92 that distribute the gaseous fuel, and a set of bores 94 that pass the oxidant. The oxidant, introduced into the primary stage via supply line 18, reaches secondary stage 85 preheated while passing through cooling passage 72. The preheated oxidant reaches an annular chamber 96 and then passes through bores 98 into an annular space 100. Annular space 100 is connected to combustion chamber 88 by a set of bores 94. The secondary gas fuel is supplied from line 102 to an annular fuel distributor 104, which is connected to bores 92. Bores 92 deliver the fuel to combustion chamber 88, where the fuel and the oxidant are mixed and form a secondary combustible mixture.

The primary thermal stage 9 operates similarly as device 10A to generate combustion stream 39. The spray powder propelled by a carrier gas is introduced at a powder port 64B of an injector 64. The powder passes through injector 64 and is introduced into combustion products 39 at an injector nozzle 64A. The dwell time of the powder is again controlled by the velocities of the carrier gas and combustion products 39.

The primary combustion-particle stream, transmitted through the nozzle, reaches combustion chamber 88 and ignites the secondary combustible mixture. After ignition, the secondary mixture forms an annular high energy stream 77 of secondary combustion products. The secondary stream is regulated by the secondary fuel and oxidant flow rates. The fuel flow rate is controlled by a valve connected to supply line 102 and the oxidant flow rate is controlled by the size of orifices 71 and 73. The flow rates of the secondary stream 77 are adjusted to avoid possible "build up" in a nozzle 45. The secondary stream 77 also minimizes energy losses of combustion-particle stream 66 and the influence of ambient air on stream 66; this increases the particle dwell time. In addition, secondary stream 77 extends the reach of combustion-particle stream 66 from the length L up to the length L1.

Figure 5:
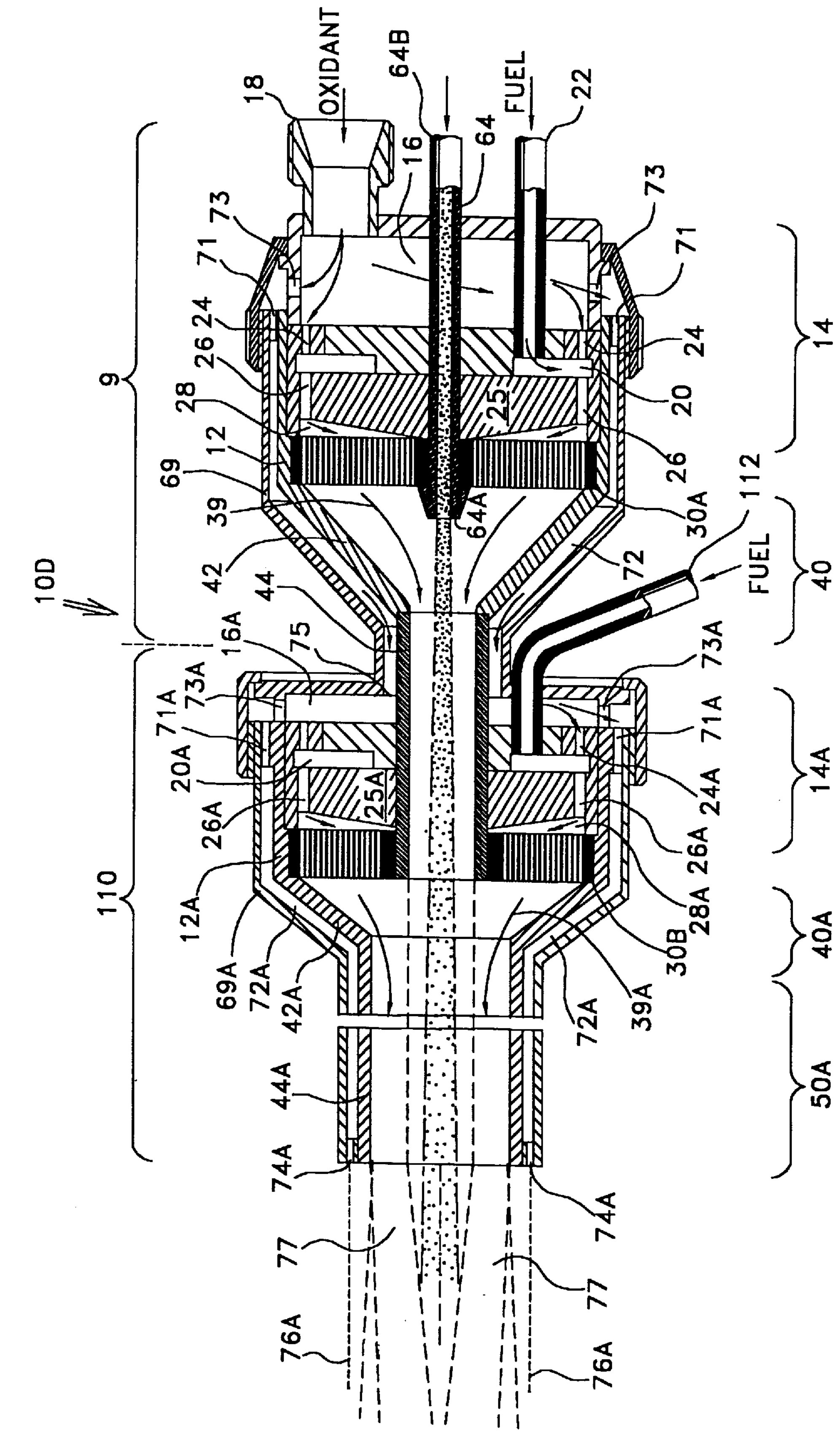

Referring to FIG. 5, in another embodiment, a thermal spray device 10D includes a primary thermal stage 9 and a secondary thermal acceleration stage 110. The primary stage is substantially the same as the primary stage of thermal spray device 10c. Secondary stage 110 includes a mixing assembly 14A and a permeable burner 30B both of which are constructed to accommodate an axially inserted nozzle body 44 of primary stage 9. Mixing assembly 14A, which has a similar design as mixing assembly 14, includes an oxidant distribution chamber 16A, a mixing chamber 20A, a mixing block 25A and a mixture distribution chamber 28A. Mixing assembly 14A receives preheated oxidant from primary stage 9 via cooling passage 72. The preheated oxidant (e.g., compressed air) enters oxidant distribution chamber 16A via opening 75 and then flows to mixing chamber 20A via cylindrical bores 24A. A fuel supply line 112 delivers fuel to mixing chamber 20A. The mixing ratio is regulated by the relative flow rates of fuel, controlled by a valve connected to fuel supply line 112, and oxidant controlled by the size of opening 75. The combustible mixture then passes through cylindrical bores 26A to mixture distribution chamber 28A and burns in burner 30B.

The preheated oxidant also flows from oxidant distribution chamber 16A to cooling passage 72A via holes 73A and 71A. The oxidant is further heated while cooling combustion body 12A, forming block body 42A and nozzle body 44A. The heated gas then exits the cooling jacket via opening 74A and forms a secondary annular stream 76A. Furthermore, systems 10C and 10D can increase the deposition velocity, reduce particle oxidation during the deposition and also increase the particle temperature, which is important for spraying powders with high melting points.

Figure 6:
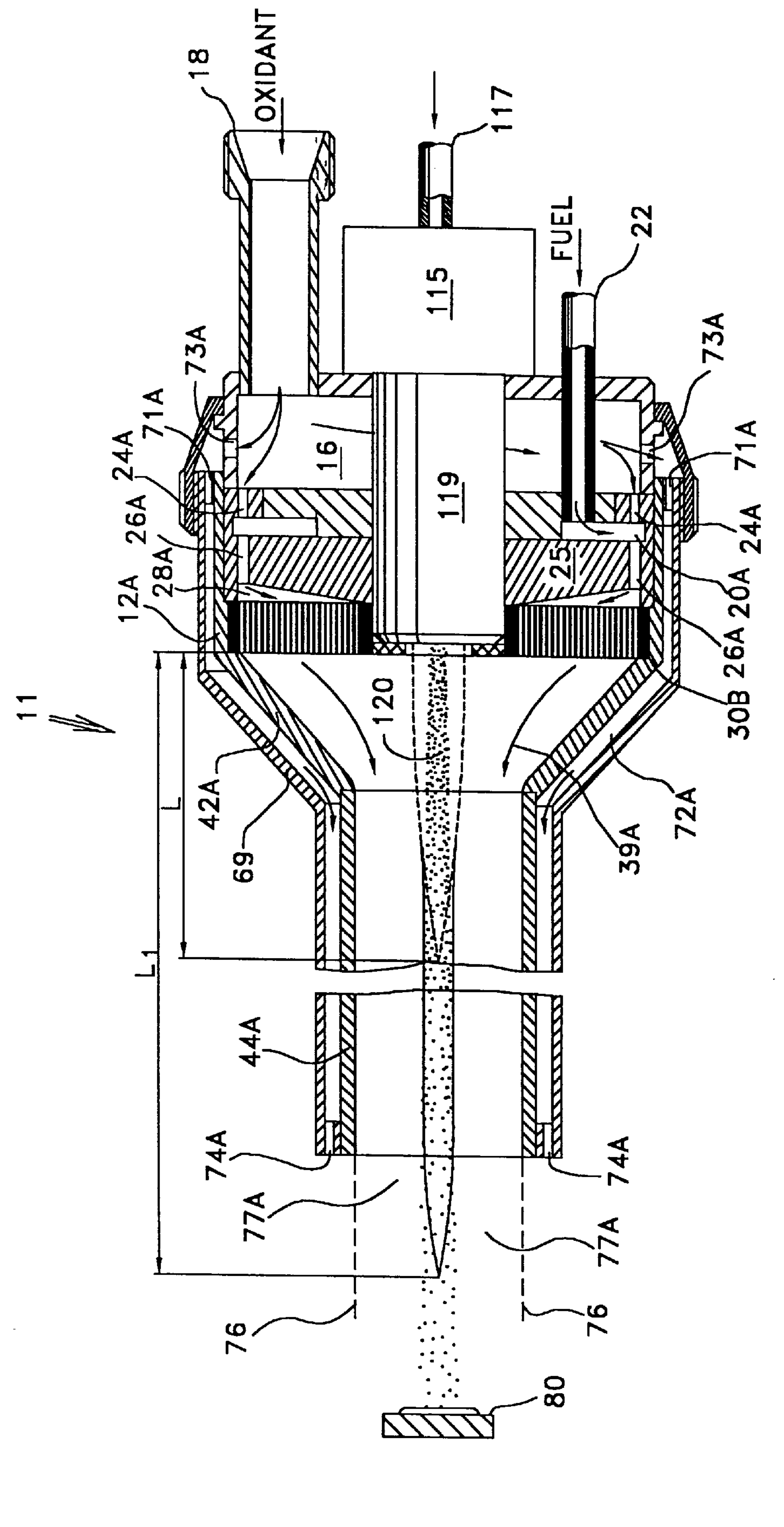
FIG. 6 is a cross-sectional view of a thermal spray device with plasma spraying unit and a secondary permeable burner.

Referring to FIG. 6, in another embodiment, a thermal spray device 11 includes a primary deposition stage, that is, a plasma spray device and a secondary thermal acceleration stage, that is, a flame spray device. A plasma torch 115 generates a primary, highly energized stream of particles, which is further accelerated by the secondary stage such as the thermal acceleration stage 110 of FIG. 5. Plasma torch 115 is commercially available from, for example, Miller Thermal, Inc. (Appleton, Wis. 54912) or MetCon Thermal Spray (Abotsford, British Columbia, Canada). Plasma torch 115 receives, at a powder port 117, spray powder propelled by a carrier gas, and emits a high temperature plasma-particle stream 120 into the forming block. As already described, the combustible mixture that reaches burner 30B is ignited by high temperature plasma-particle stream 120 and generates high energy combustion products 39A. Combustion products 39A generate a secondary stream 77A that interacts with the primary plasma-particle stream 120 the same way as described in connection with thermal spray devices 10C and 10D.

Furthermore, in another embodiment, thermal spray systems 10, 10A, 10B or 10C are outfitted with an additional, external arc unit. Similarly as will be described in connection with FIGS. 8 and 8A, the arc unit includes a voltage power supply and two electrode wires extending through wire guides and having the wire tips properly aligned relative to the exhaust nozzle. During the combustion process, an electric arc is ignited across the wire tips and is maintained by the power supply. A motor assembly advances the electrode wires in a controllable manner to maintain a desired spacing between the electrode tips. The emitted combustion-particle stream then atomizes and propels the melted tip material. Thus, this thermal spray system can simultaneously spray material from a powder feed stock and from solid or cored electrodes.

Figure 7:
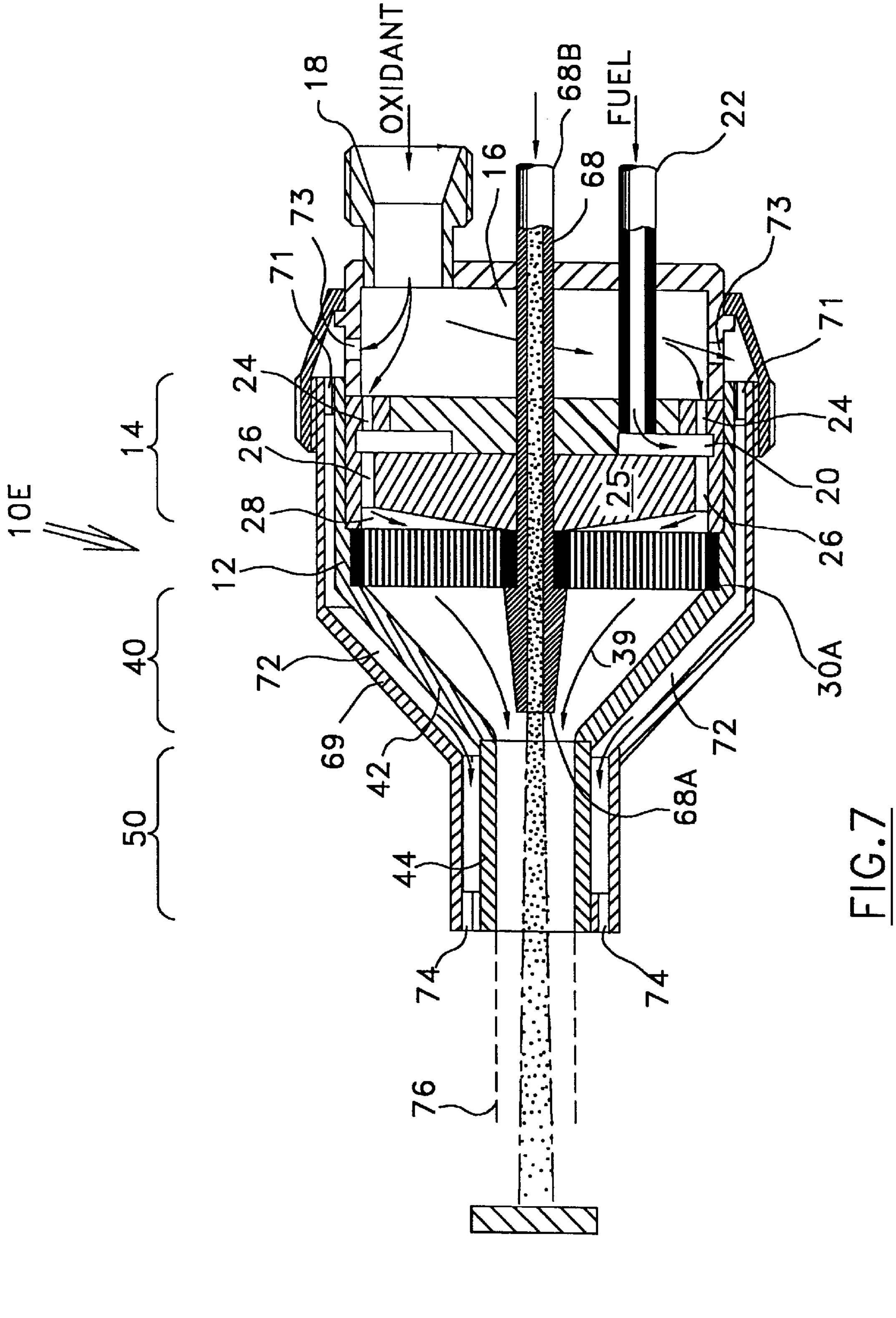
FIG. 7 is a cross-sectional view of a thermal spray device arranged for high velocity sand blasting.

Referring to FIG. 7, in another embodiment, a thermal spray device 10E is constructed and arranged for high velocity "sand blasting". Device 10E has a similar overall design as primary thermal stage 9 of thermal spray device 10D, but includes a grit feeding tube 68 instead of powder injector 64. Grit feeding tube 68 is made of a high temperature erosion resistant material, such as SiC or other ceramic materials. Abrasive powder propelled by a carrier gas is supplied to powder port 68B of tube 68 and introduced into forming block 40. Since the introduced grit does not have to be melted, the dwell time can be significantly shortened. To minimize grit collisions with the inner walls of forming block body 42 and nozzle body 44, injector nozzle 68A is extended into the central part of forming block 40 and the length of nozzle 50 is also shortened. Again, compressed air may be used as both an oxidant and a coolant. In addition to forming the combustible mixture in mixing chamber 20, compressed air passes via holes 73 and 71 to cooling passage 72 and cools combustion body 12, forming block body 42 and nozzle body 44. The preheated compressed air then exits the cooling jacket via opening 74 and forms a secondary annular stream 76.

Figure 8:
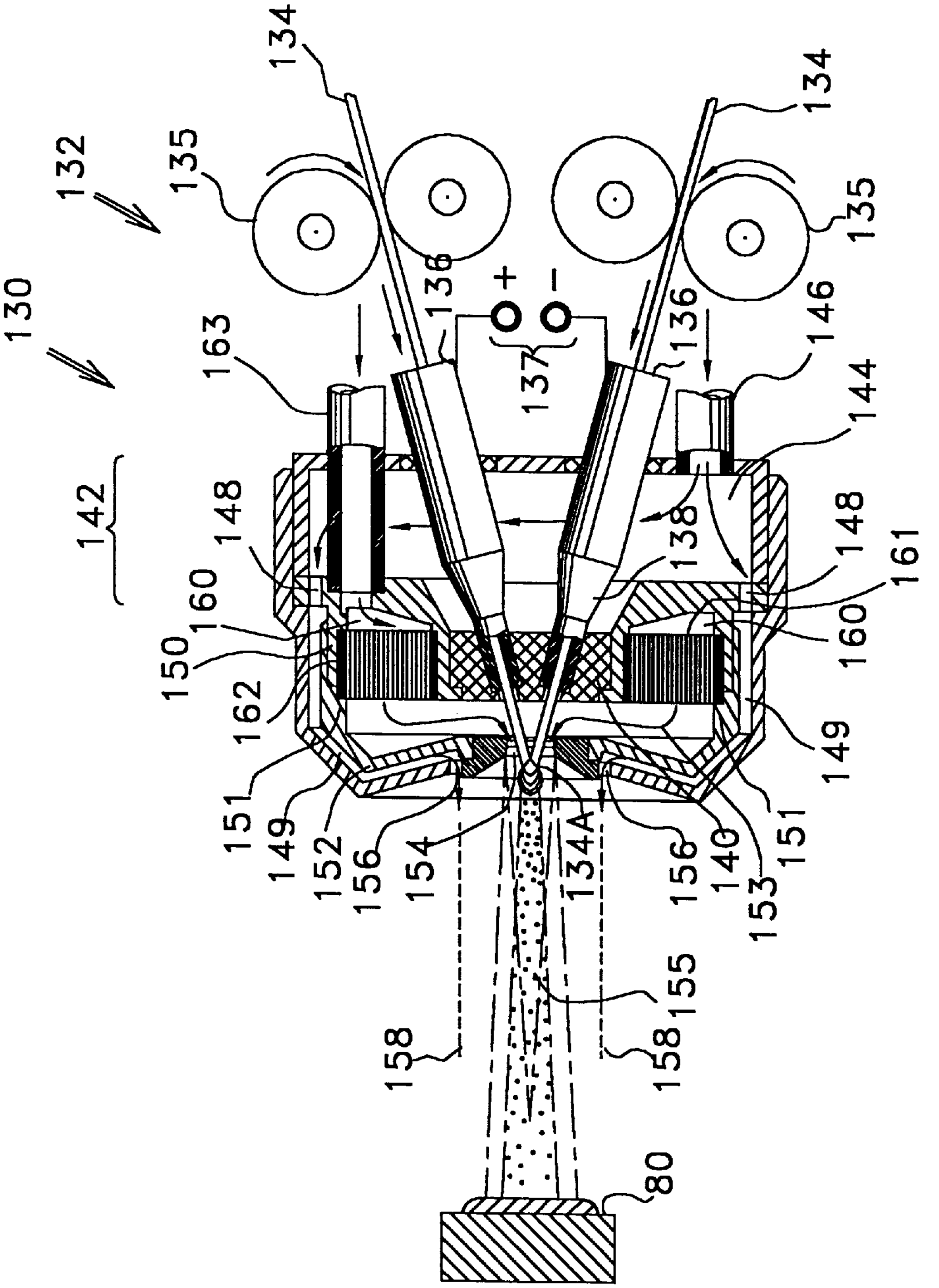
FIGS. 8 and 8A are cross-sectional views of different embodiments of an arc spray device.

Referring to FIG. 8, another important embodiment of the present invention is an arc spray device 130. Arc spray device 130 includes a material delivery unit, a combustion unit, and an exhaust nozzle. The material delivery unit is an arc spray system 132 with consumable electrodes. Arc spray system 132 includes two electrode wires 134 extending from a wire feeding system (only rollers 135 shown in FIG. 8) through wire guides 136 and guide tips 138. Guide tips 138 are placed into a ceramic insulation bushing 140 that maintains a proper alignment of wire tips 134A relative to each other and which are symmetrical relative to the axis of an exhaust nozzle 154. The system may use different exhaust nozzles of a diameter in the range 7.5 mm to 25 mm. A preferable nozzle diameter is in the range of 10 mm to 15 mm since such a nozzle does not have a large consumption of the combustible medium, but is sufficiently large to reduce significantly or eliminate completely divergence of the high-energy particle stream.

The combustion unit includes a distribution assembly 142 and an annular permeable burner 162. Permeable burner 162 is located between a shoulder 151 of a forming block body 152 and a combustion burner body 150. Distribution assembly 142 includes a coolant distribution chamber 144 connected to a coolant supply line 146, and a mixture distribution chamber 160 connected to a combustible mixture supply line 163. Distribution chamber 160 is constructed to distribute uniformly the combustible mixture over upstream surface 161 of burner 162 in the same manner as described above in connection with the thermal spray devices. Coolant chamber 144 is connected via a set of cylindrical bores 148 to a cooling jacket 149 that surrounds combustion burner body 150 and forming block body 152 and protects them against overheating.

Oxidant and fuel are mixed outside of device 130 and are delivered to distribution chamber 160, where the combustible mixture is uniformly distributed over an upstream surface 161 of burner 162. The mixture is initially ignited by a conventional igniter and a produced combustion stream 153 enters a relatively short forming block connected to exhaust nozzle 154. A compressed gas, delivered by coolant supply line 146, passes from coolant chamber 144 through cooling jacket 149 and exits via an annular slot 156 to create an annular stream 158.

During the combustion process, an electric arc is ignited across electrode wire tips 134A and is maintained by a voltage source 137. Voltage source 137 is connected to a voltage feedback unit constructed to stabilize the electric arc at a selected current and voltage. As the electric arc melts electrode wires 134, the melted material is atomized and accelerated by combustion stream 153 from nozzle 154 toward substrate 80. A motor assembly (e.g., made by Reliance Motion Control, Eden Praire, Minn.) is connected to rollers 135 that advance electrode wires 134. To maintain a substantially constant separation and geometry of electrode wire tips 134A, rollers 135 advance electrode wires 134 at the rate that corresponds to the material removal at tips 134A; this achieves a constant deposition rate.

Alternatively, in another embodiment, an arc spray device has a combustion unit with a conventional combustion chamber instead of annular permeable burner 162. The combustion chamber may have a similar construction as combustion chamber 88 of thermal spray device 10C shown in FIG. 4. The combustion chamber receives a combustible mixture from a mixing assembly and generates a combustion stream in a continuous combustion process. The parameters of the combustion process are adjusted so that the pressure of the combustion stream is in the range of 25 psi to 100 psi (corresponding to the velocity of the combustion stream in the range of 0.9 to 1.9 sonic velocity at the exhaust nozzle). Furthermore, similar to arc spray device 130, this arc spray device uses an annular stream that exits an annular slot around the nozzle to counteract the Lorentz force and any other disturbance (e.g., shock waves arising from velocities above the sonic velocity) generated in the nozzle region and "focuses" the primary particle stream. Furthermore, the annular stream minimizes the influence of ambient air on the melted particle stream; this reduces particle oxidation and reduction in velocity of the particle stream.

Figure 8A:
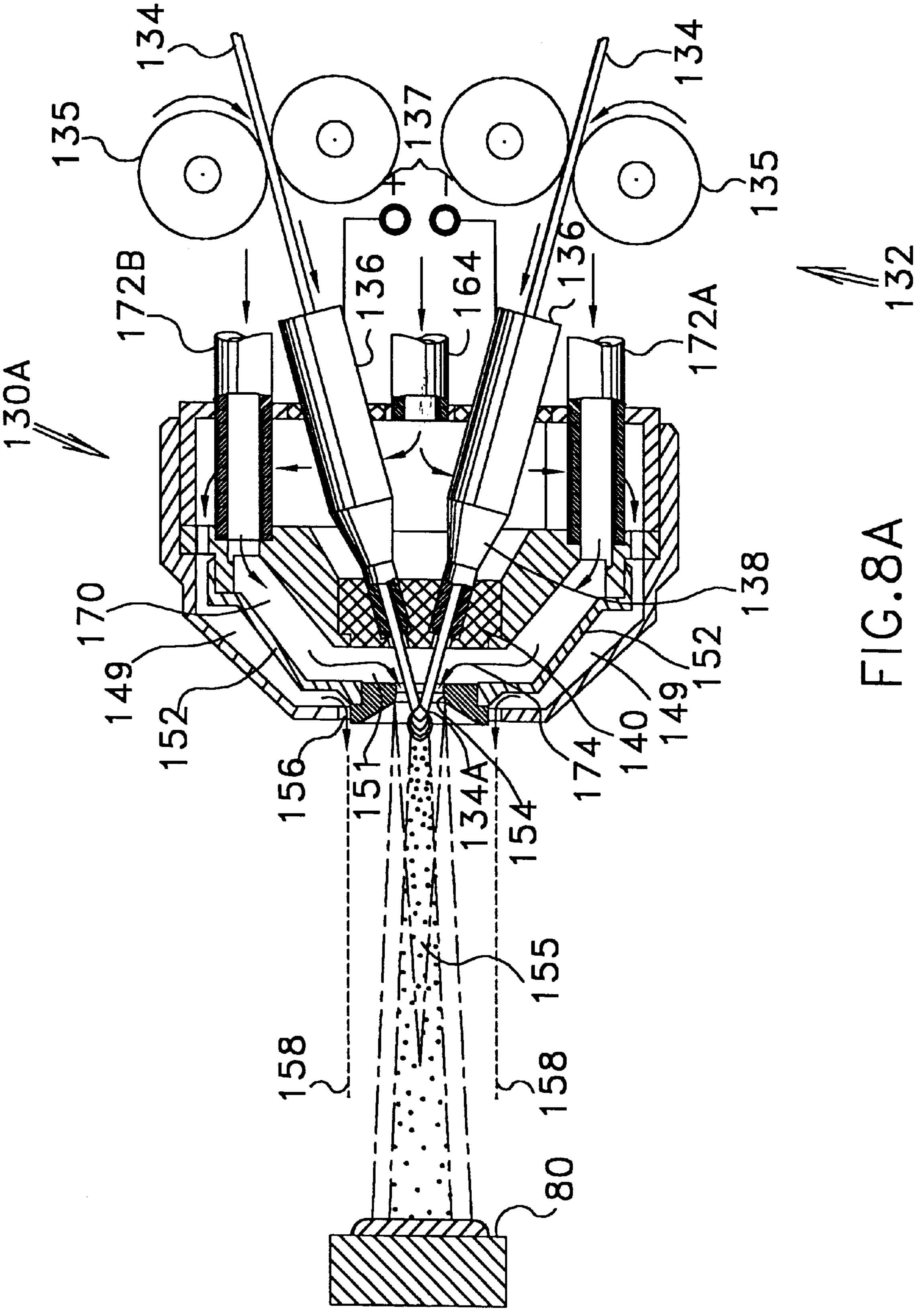

Referring to FIG. 8A, alternatively, an arc spray devices 130A is constructed to employ a source of high-energy gas somewhat remotely located relative to exhaust nozzle 154. This source of high-energy gas replaces the combustion unit including the annular permeable burner 162 of arc spray devices 130. The high-energy gas source, schematically shown in locations 172A and 172B, includes a source of a high pressure gas and a heat exchanger. The heat exchanger is a plasma source, an electrical heat source or the like, which heats the high pressure gas flowing to a forming chamber 170. The high-energy gas of a selected pressure and temperature is forced through forming chamber 170 to exhaust nozzle 154. Due to a constricted geometry of forming chamber 170 and a high pressure of the preheated gas, exhaust nozzle 154 emits a high-energy, high velocity stream 174 directed to electrode tips 134A. As mentioned above, the quality of the sprayed coating depends on the size and temperature of the propelled particles, feeding rates of the electrodes, alignment of the tips, and the ability to maintain a stable arc.

In both arc spray devices 130 and 130A, wire tips 134A and the electric arc are positioned outside of nozzle 154 otherwise a portion of the melted material would be deposited on the walls of nozzle 154. The parameters of the combustion process are adjusted so that the pressure of the combustion stream 164 is in the range of 25 psi to 100 psi. (Similarly, the pressure of stream 174 is maintained in about the same range when exiting nozzle 154.) The pressure of the stream is also adjusted based on the desired type of the coating. To generate larger particles, the pressure of combustion stream 164 (or stream 174) is moved to a range of about 25 psi to 60 psi, thus lowering the velocity of a particle stream 155. When these larger particles arrive at surface 8, they solidify over a relatively longer period of time; this process yields films of high strength, but also a relatively larger porosity. Such films are frequently preferable for relatively thin layers initially deposited on a substrate since they provide high quality bonding. To generate smaller particles, the pressure of combustion stream 164 (or stream 174) is moved to a range of about 50 psi to 80 psi. The smaller particles solidify faster, but yield films with a lower porosity.

Furthermore, the pressure of the coolant gas, provided by supply line 146, is also adjusted so that annular stream 158 exits annular slot 156 at a selected velocity. Again, annular stream 158 counteracts the Lorentz force generated in the nozzle region to "focus" the primary particle stream. Furthermore, annular stream 158 minimizes the influence of ambient air on the melted particle stream, or may be selected to alter the chemistry of the melted particle stream.

Figure 9:
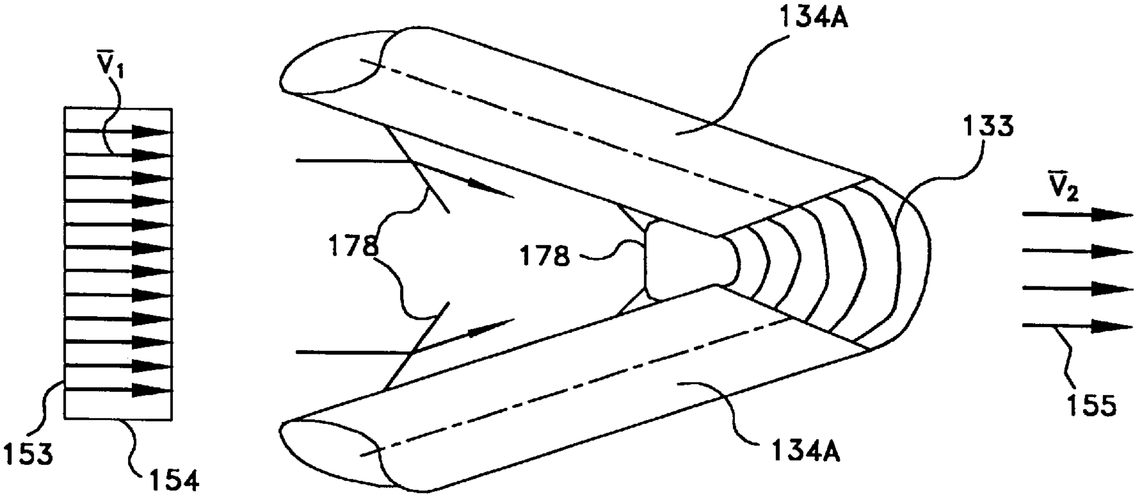
FIGS. 9 and 9A are schematic cross-sectional views of interaction between a combustion stream and electrode tips, including an electric arc, of the arc spray devices of FIGS. 8 and 8A.
Figure 9A:
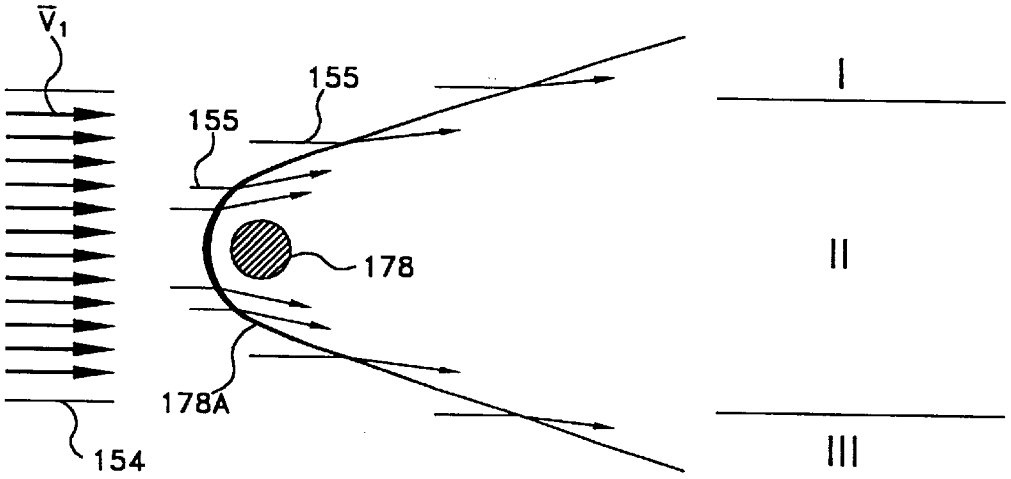

FIGS. 9 and 9A depict schematically the interaction between combustion stream 153 and electric arc 133 generated between tips 134A. Combustion stream 153 exits nozzle 154 at a velocity $v_1$ (schematically shown by a set arrows although the flow is not laminar). It is desirable to use a very high velocity combustion stream 153 because a high velocity jet generates smaller particles of the molten material (the minimum particle size also depends on surface tension of the melted particle). However, when the combustion stream velocity is higher than the sound velocity in the medium, the combustion stream excites a series of shock waves 178 mainly as it crosses though arc region 133. The intensity of the shock waves further increases if the combustion stream velocity $v_1$ is further increased. Furthermore, the intensity of the shock waves decreases with the radial distance from arc region 133, as shown by curve 178A. In turn, the shock waves disperse emitted gas stream 155. Therefore, the high energy gas stream can be described in terms of regions I, II, and III. Regions I and III are regions of a high velocity and a low disturbance, and a region II is a region of a relatively high disturbance depending on the intensity of the shock waves. By increasing the diameter of nozzle 154, the relative size of regions I and III can be increased. Furthermore, since the sonic velocity increases with the temperature of the combustion gas ($a \approx T^{1/2}$), high temperatures enable higher velocities of particle stream 155 before the shock waves are excited.

Annular stream 158 (FIGS. 8 and 8A) is also useful in counteracting the dispersion due to the shock waves generated in the nozzle region. Furthermore, since the shock waves are generated mainly in the arc region, the system may use an annular stream 158 having a supersonic velocity for acceleration of combustion particle stream 155. The system optimizes the above parameters in a manner that the melted particles are deposited on the substrate at velocities where splashing or sputtering of the molten material is minimized. Thus, each particle forms a substantially continuous deposit over a tiny area of the substrate.

The above described thermal spray systems deposit coatings of different metals (e.g., ferrous metals, nonferrous metals—Al, Ni, Cu, or Ti), borides (e.g., $CrB_2$, $SiB_6$, $TiB_2$, $W_2B_5$, $NbB_2$, $ZrB_3$, $HFB_2$, or $AlB_{12}$), carbides (e.g., $Cr_3C_2$, SiC, TiC, WC, NbC, ZrC, or HfC), nitrides (e.g., BN, $Si_3N_4$, AlN, TiN, CrN, ZrN, HfN, NbN, $No_2N$, or $W_2N$), oxides (e.g., $Al_2O_3$, $Cr_2O_3$, $SiO_2$, $ZrO_2$, or $TiO_2$) silicides ($TiSi_2$, $Cr_3Si_2$, $WSi_2$, $MoSi_2$, $ZrSi_2$, $HFSi_2$, $VSi_2$, $NbSi_2$, or $TaSi_2$), or different glasses, such as traditional ceramic or metallic glasses.

A manually controlled version of an arc spray system 130 was used to deposit a coating of INCO 625 (consisting of 21% Cr, 8% Mo, 3.5% Ta and Nb, with the balance made by Ni) on 12"x12"x¼" carbon steel substrates. System 130 used a Miller power source. The control console included a capillary air mass-flowmeter connected to air supply through 11-042 pilot operated regulator (Norgren), allowing the pressure to be stabilized at 90 psi for 1000 scfh air flow rate. Propane at flow rates of 20 scfh to 60 scfh was regulated through H-03269-37 flowmeter with 044-40C tube (ColeParmer) connected to a ½" NPT D3 CT/CT/82 (CASHCO Inc.) propane regulator that supports 60 psi line pressure connected to a cylinder at 90 psi to 100 psi.

Prior to deposition, the sample surface was first grid blasted with Cast Iron 16 grid of 1 mm to 2.5 mm particle size emitted at 100 psi from a nozzle of 8 mm in diameter at 90°. Several test depositions were performed at a traverse speed of 24 in/sec with a 0.5 in step. Different runs used an arc current in the range of 150 Amp to 250 Amp at about 37 Volts. The arc spray system used either a 7.5 mm nozzle or a 10 mm nozzle with an air flow rate between 600 scfh and 980 scfh at 90 psi, and a propane flow rate between 23 scfh and 28 scfh at 60 psi. Preliminarily, with the 10 mm nozzle, good quality films were obtained in runs having an arc current of 180 Amp, an air flow rate of 980 scfh and a propane flow rate of 43 scfh. These films had a bond strength of about 41 MPa and a coefficient of permeability of about $7.4(9)\cdot 10^{-8}$ $cm^2$.

Other embodiments are within the following claims:

We claim:

1. A thermal spray system for coating a substrate with a material comprising:

a combustion unit connected to at least one port constructed to supply a flow of a combustible fluid from an external source of fuel and oxidant, said combustion unit including a permeable burner block including an upstream surface and a downstream surface;

said permeable burner block constructed to receive said combustible fluid, formed by a mixture of said fuel and said oxidant, at said upstream surface and to pass said combustible fluid in a plurality of orifices toward said downstream surface, said burner block being arranged to heat, ignite and burn said combustible mixture adjacent to said downstream surface including inside said orifices to generate an energized stream of gas;

an exhaust nozzle constructed to receive said stream of gas and direct said stream of gas toward a substrate; and a material delivery unit constructed to deliver a selected material into said energized stream of gas to form a energized stream of particles.

2. The thermal spray system of claim 1 wherein said permeable burner block includes said plurality of orifices having a selected size for optimal transport of said combustible fluid.

3. The thermal spray system of claim 1 wherein said permeable burner block is made of a porous ceramic material arranged to pass said combustible fluid and facilitate said combustion.

4. The thermal spray system of claim 1, 2 or 3 wherein said material delivery unit includes an injector constructed to inject a controlled quantity of said selected material to said energized stream.

5. The thermal spray system of claim 4 wherein said injector is connected to said nozzle at a selected angle, said injector constructed to inject controlled quantity of particles to said energized stream passing through said nozzle and control a dwell time of said particles.

6. The thermal spray system of claim 1, 2 or 3 wherein said plurality of orifices are further designed to pass said combustible fluid at a flow rate larger than flame velocity during said combustion.

7. The thermal spray system of claim of claim 4 further comprising an external electric arc unit including:

two consumable electrodes with tips aligned in front of said nozzle;

an electric power supply constructed to maintain an electric arc between said tips of said electrodes, said electric arc arranged to melt at least partially said tips;

a motor assembly constructed to feed said two consumable electrodes at a rate of removal of said material from said tips by said energized stream of gas and particles.

8. The thermal spray system of claim 1 wherein said material delivery unit includes several injectors, each said injector being constructed to inject a controlled quantity of said selected material to said energized stream.

9. The thermal spray system of claim 8 wherein each said injector is connected to said nozzle, said injector constructed to inject controlled quantity of particles to said energized stream passing through said nozzle.

10. The thermal spray system of claim 1 wherein said material delivery unit includes an injector located in a bore of said combustion unit and constructed to introduce axially controlled quantity of particles to said energized stream passing axially through said nozzle.

11. The thermal spray system of claim 1, 2 or 3 wherein said material delivery unit further includes a source of a carrier gas connected to said injector;

a dispenser constructed to introduce a controlled quantity of particles of said selected material to said carrier gas to create a particle-gas medium; and an injector constructed to inject said particle-gas medium into said energized stream of gas.

12. The thermal spray system of claim 11 wherein said source is a plasma arc torch constructed to preheat said carrier gas to a selected temperature.

13. The thermal spray system of claim 11 wherein said injector is located in a bore of said combustion unit and constructed to introduce axially said particle-gas medium into said energized stream of gas.

14. The thermal spray system of claim 11 wherein said material delivery unit further includes a heater constructed to preheat said carrier gas to a selected temperature.

15. The thermal spray system of claim 11 wherein said material delivery unit further includes a pressure controller constructed and arranged to control pressure of said carrier gas.

16. The thermal spray system of claim 11 further comprising a heat exchange conduit at least partially surrounding said combustion unit or said nozzle, said conduit constructed to convey said carrier gas prior to injecting said gas-particle medium into said energized stream.

17. The thermal spray system of claim 1, 2 or 3 wherein said material delivery unit includes a feeding mechanism constructed to gradually introduce said selected material, shaped to form an elongated member, into said energized stream of gas.

18. The thermal spray system of claim 17 wherein said elongated member is one of the following: a tape, a cord, a wire, and a rod.

19. The thermal spray system of claim 17 wherein said elongated member includes a core made of a selected powder.

20. The thermal spray system of claim 19 wherein said elongated member is one of the following: a tape, a wire, and a rod.

21. The thermal spray system of claim 17 wherein said feeding mechanism is constructed to introduce said elongated member axially through a bore in said combustion unit.

22. The thermal spray system of claim 1 further including a pressure controller constructed to control pressure of said combustible fluid.

23. The thermal spray system of claim 1 further including a fuel port and an oxidant port both connected to a mixing region, said external source including separate sources of said fuel and said oxidant, connected to said fuel port and said oxidant port, respectively.

24. The thermal spray system of claim 23 wherein said fuel port is connected to a fuel pressure controller constructed to control pressure of said fuel, and said oxidant port is connected to an oxidant pressure controller constructed to control pressure of said oxidant.

25. The thermal spray system of claim 1, 2 or 3 further comprising a high-pressure gas unit including:

an external gas source constructed to provide a high-pressure gas;

a heat exchange conduit, at least partially surrounding said combustion unit or said nozzle, constructed to receive said high-pressure gas from said external gas source and to convey said high-pressure gas to provide cooling of external surfaces of said combustion unit or said nozzle; and an annular opening, located at a distal end of said nozzle, constructed and arranged to emit axially an annular stream of gas surrounding said energized stream of particles.

26. The thermal spray system of claim 25 wherein said gas source provides a gas pressure selected relative to a size of said annular opening so that said annular stream of gas has about the same velocity as said energized stream of particles.

27. The thermal spray system of claim 25 wherein said gas source provides an inert gas.

28. The thermal spray system of claim 25 wherein said gas source provides nitrogen.

29. The thermal spray system of claim 1, 2 or 3 further comprising:

an additional combustion unit having an annular geometry around said exhaust nozzle, said additional combustion unit constructed to generate an energized stream of annular cross section; and an additional exhaust nozzle constructed and arranged to receive said annular stream and emit axially said energized annular stream surrounding said energized stream of particles.

30. The thermal spray system of claim 29 wherein said additional combustion unit includes an additional permeable burner.

31. The thermal spray system of claim 29 wherein said second combustion unit includes a combustion chamber.

32. The thermal spray system of claim 29 wherein said additional nozzle is made of a ceramic material.

33. The thermal spray system of claim 1, 2 or 3 wherein combustion unit has an axial bore and said material delivery unit includes a plasma torch, partially located in said bore, constructed to deliver axially said material in form of at least partially melted particles into said energized stream of gas.

34. The thermal spray system of claim 1, 2 or 3 wherein said combustion unit has an axial bore and said material delivery unit includes an electric arc unit with consumable electrodes extending through said bore.

35. The thermal spray system of claim 1, 2 or 3 wherein said combustion unit includes a bore and said material delivery unit including two consumable electrodes of said material extending through said bore;

a motor assembly constructed to move said two electrodes continuously along intersecting paths;

an electric arc source constructed to maintain an electric arc between the tips of said electrodes, said electric arc being axially aligned with said nozzle and arranged to melt at least partially said tips; and said exhaust nozzle further constructed to direct said stream of gas toward said electric arc thereby creating said energized stream of particles directed to said substrate.

36. The thermal spray system of claim 35 wherein at least one of said elongated members includes a powder core surrounded by a metallic shell.

37. An electric arc spraying system for coating a substrate with a selected material comprising:

a motor assembly constructed to feed two consumable electrodes of said material;

an electric arc unit including an electric power supply constructed to maintain an electric arc between tips of said electrodes, said electric arc arranged to melt at least partially said tips;

a thermal source connected to a supply of high-pressure gas, remotely located from said electric arc, and constructed to generate an energized stream of gas of a pressure between 25 psi and 100 psi; and an exhaust nozzle constructed to receive said energized stream of gas from said thermal source and emit said energized gas stream toward said melted tips thereby forming an energized stream of at least partially melted particles directed to said substrate.

38. An electric arc spraying system of claim 37 further including a feedback unit, connected to said electric power supply, constructed to stabilize said electric arc at a selected current and voltage.

39. The electric arc spraying system of claim 37 wherein said thermal source includes a plasma source constructed to generate said energized gas.

40. The electric arc spraying system of claim 37 wherein said thermal source includes an electrical heat exchange unit constructed to generate said energized gas.

41. The electric arc spraying system of claim 37 wherein said thermal source includes a combustion unit constructed to generate said energized gas.

42. The electric arc spraying system of claim 41 wherein said combustion unit includes a permeable burner.

43. The electric arc spraying system of claim 37 further comprising a high-pressure gas unit including:

a second supply of gas constructed to provide high-pressure gas;

a heat exchange conduit, at least partially surrounding said nozzle, constructed to receive said high-pressure gas from said second supply and to convey said high-pressure gas to provide cooling of external surfaces of said combustion unit or said nozzle; and an annular opening, located at a distant end of said nozzle, constructed and arranged to emit axially an annular stream of gas surrounding said energized stream of at least partially melted particles.

44. The electric arc spraying system of claim 43 wherein said high-pressure gas unit is arranged to emit said annular stream at a velocity of said energized stream of at least partially melted particles.

45. The electric arc spraying system of claim 43 wherein said high-pressure gas unit is arranged to emit said annular stream at a selected temperature.

46. The electric arc spraying system of claim 37 wherein said exhaust nozzle has a diameter between 7.5 millimeters and 25 millimeters.

47. The electric arc spraying system of claim 37 wherein said exhaust nozzle has a diameter between 10 millimeters and 15 millimeters.

48. A thermal spray system for delivering abrasive material to a substrate comprising:

a combustion unit connected to at least one port constructed to supply a flow of a combustible fluid from an external source of fuel and oxidant, said combustion unit including a permeable burner block including an upstream surface and a downstream surface;

said permeable burner block constructed to receive said combustible fluid, formed by a mixture of said fuel and said oxidant, at said upstream surface and to pass said combustible fluid in a plurality of orifices toward said downstream surface in order to facilitate combustion that generates an energized stream of gas;

an exhaust nozzle constructed to receive said stream of gas and direct said stream of gas toward a substrate; and a material delivery unit constructed to deliver particles of an abrasive material into said energized stream of gas to form a highly energized stream of abrasive particles.

49. The thermal spraying system of claim 48 wherein said material delivery unit includes an injector constructed to inject a controlled quantity of said abrasive material to said energized stream.

50. The thermal spray system of claim 49 wherein said injector is made of a ceramic material.

51. The thermal spray system of claim 50 wherein said ceramic material is one of the following: silicon carbide, boron carbide, tungsten carbide, silicon nitride, aluminum oxide and chromium oxide.

52. The thermal spray system of claim 48 wherein said material delivery unit further includes a source of a carrier gas connected to said injector;

a dispenser constructed to introduce a controlled quantity of particles of said abrasive material to said carrier gas to create a particle-gas medium; and said injector further constructed to inject said particle-gas medium into said energized stream of gas.

53. The thermal spray system of claim 52 wherein said injector is located in a bore of said combustion unit and is constructed to introduce axially said particle-gas medium into said energized stream of gas.

54. The thermal spray system of claim 48 wherein said exhaust nozzle is made of a ceramic material.

55. The thermal spray system of claim 54 wherein said ceramic material is one of the following: silicon carbide, boron carbide, tungsten carbide, silicon nitride, aluminum oxide and chromium oxide.

* * * * *